(12) United States Patent
Sarafianos et al.

(10) Patent No.: US 11,387,194 B2
(45) Date of Patent: Jul. 12, 2022

(54) METHOD FOR DETECTING AN ATTEMPT TO BREACH THE INTEGRITY OF A SEMICONDUCTOR SUBSTRATE OF AN INTEGRATED CIRCUIT FROM ITS BACK FACE, AND CORRESPONDING INTEGRATED CIRCUIT

(71) Applicant: STMicroelectronics (Rousset) SAS, Rousset (FR)

(72) Inventors: Alexandre Sarafianos, Pourrieres (FR); Fabrice Marinet, Chateauneuf le Rouge (FR); Julien Delalleau, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 80 days.

(21) Appl. No.: 15/930,217

(22) Filed: May 12, 2020

(65) Prior Publication Data
US 2020/0365528 A1 Nov. 19, 2020

(30) Foreign Application Priority Data
May 13, 2019 (FR) ...................................... 1904942

(51) Int. Cl.
*H01L 23/00* (2006.01)
*G06F 21/55* (2013.01)

(52) U.S. Cl.
CPC .......... *H01L 23/573* (2013.01); *G06F 21/554* (2013.01); *G06F 2221/034* (2013.01)

(58) Field of Classification Search
CPC ..... H01L 23/00; H01L 23/573; H01L 23/647; H01L 23/576; G06F 21/55; G06F 21/554; G06F 2221/034; G06K 19/07372

USPC ......................................................... 257/922
See application file for complete search history.

(56) References Cited

U.S. PATENT DOCUMENTS

| 2010/0187527 A1 | 7/2010 | Van Geloven et al. |
| 2011/0210956 A1* | 9/2011 | Girdhar ............ H01L 29/66659 345/212 |
| 2014/0070378 A1* | 3/2014 | Yamashita ............ H01L 29/365 257/655 |
| 2016/0042199 A1 | 2/2016 | Joharapurkar et al. |

(Continued)

FOREIGN PATENT DOCUMENTS

| FR | 2986356 A1 | 8/2013 |
| FR | 2998419 A1 | 5/2014 |

(Continued)

OTHER PUBLICATIONS

INPI Search Report and Written Opinion for FR 1904942 dated Dec. 6, 2019 (8 pages).

*Primary Examiner* — Sheng-Bai Zhu
(74) *Attorney, Agent, or Firm* — Crowe & Dunlevy (57) ABSTRACT

A semiconductor substrate has a front face and a back face. A first contact and a second contact, spaced apart from each other, are located on the front face. An electrically conductive wafer is located on the back face. A detection circuit is configured to detect a thinning of the substrate from the back face. The detection circuit including a measurement circuit that takes a measurement of a resistive value of the substrate between said at least one first contact, said at least one second contact and said electrically conductive wafer. Thinning is detected in response to the measured resistive value.

20 Claims, 5 Drawing Sheets

(56) References Cited

U.S. PATENT DOCUMENTS

| | | | |
|---|---|---|---|
| 2017/0243652 A1* | 8/2017 | Fornara | H01L 22/34 |
| 2018/0247901 A1* | 8/2018 | Marzaki | H01L 29/0649 |
| 2019/0043814 A1* | 2/2019 | Marzaki | H01L 27/0285 |
| 2019/0081011 A1* | 3/2019 | Sarafianos | H01L 22/00 |
| 2019/0109100 A1* | 4/2019 | Sarafianos | H01L 29/0646 |
| 2019/0244915 A1 | 8/2019 | Sarafianos et al. | |

FOREIGN PATENT DOCUMENTS

| | | |
|---|---|---|
| FR | 3063385 A1 | 8/2018 |
| WO | 2009016589 A2 | 2/2009 |

* cited by examiner

METHOD FOR DETECTING AN ATTEMPT TO BREACH THE INTEGRITY OF A SEMICONDUCTOR SUBSTRATE OF AN INTEGRATED CIRCUIT FROM ITS BACK FACE, AND CORRESPONDING INTEGRATED CIRCUIT

PRIORITY CLAIM

This application claims the priority benefit of French Application for Patent No. 1904942, filed on May 13, 2019, the content of which is hereby incorporated by reference in its entirety to the maximum extent allowable by law.

TECHNICAL FIELD

Embodiments and implementations relate to integrated circuits, in particular to the detection of an attempt to breach the integrity of the substrate of an integrated circuit, especially to detection of thinning of a substrate.

BACKGROUND

Integrated circuits, in particular those provided with memories containing sensitive information, have to be protected to the greatest possible extent from attacks, in particular from attacks aiming to uncover stored data.

Among the possible attacks for extracting confidential data from a memory of an integrated circuit, for example a protected memory of a chip card, it is known in the art to perform an attack referred to as fault injection attacks (or DFA, for differential fault analysis). This attack aims to interfere with the operation and/or the content of the memory, or to modify the logic operation of the circuit, for example by means of radiation (laser, infrared, X-ray, etc. radiation) transmitted through the back face of the chip.

This attack may, for example, be carried out by means of a focused ion beam (FIB) probe, using a focused ion beam to machine or to deposit materials at the nanoscale.

The effectiveness of this attack increases when the substrate of the integrated circuit is thinned by the attacker, from its back face, so as to get as close as possible to the components of the integrated circuit that are formed at its front face.

A preliminary step of thinning in this way may comprise, for example, an operation of mechanical or chemical-mechanical polishing from the back face.

It is therefore particularly useful to seek to protect the integrated circuit against an attack from the back face of the substrate.

One solution has been proposed in United States Patent Application Publication No. 2019/0244915 (French Application for Patent No. 1851011), incorporated by reference.

This solution envisages, in particular, measuring the vertical resistance of the substrate.

Although such a solution is generally satisfactory, it can prove to be less effective in some cases. Specifically, the operation of detecting a thinning of the substrate can be disrupted by variations in temperature or supply voltage or by variations in the characteristics of the components from one integrated circuit to the next due to variations in the fabrication process.

What may then sometimes result is a thinning of the substrate not being detected, in particular in the case of a slight thinning.

In particular, there is a need to be able to detect, straightforwardly and effectively, a thinning of the substrate from the back face, even if this thinning is slight.

SUMMARY

In an embodiment, a method is proposed for detecting an attempt to breach the integrity of an integrated circuit including a semiconductor substrate having a front face and a back face.

The method according to this aspect comprises an operation of detecting a thinning of the substrate from the back face.

This operation of detecting thinning comprises a first operation of measuring a resistive value of the substrate between at least one first contact, at least one second contact, which are spaced apart and located on the front face, and an electrically conductive wafer located on the back face.

This electrically conductive wafer may be the wafer that is initially attached to the back face of the substrate during the fabrication of the integrated circuit, in the case in which no attempt to breach the integrity of the integrated circuit has been made, in particular no thinning of the substrate.

However, to thin the substrate, an attacker will generally either remove the initial wafer in its entirety or locally remove a portion thereof in order to thin the substrate from the exposed portion or the entirety of the back face of the substrate.

The electrically conductive wafer may then be either the initial wafer with a portion that has been removed, the initial wafer that has been removed then re-added by the attacker after the substrate has been thinned, or another electrically conductive wafer that has been added by the attacker after the substrate has been thinned.

In this first measurement operation, both the vertical resistance of the substrate between the first contact and the wafer and the lateral resistance of the substrate between the two contacts are taken into account.

This allows greater sensitivity of measurement and allows a slight thinning of the substrate to be detected more easily with respect to measuring the vertical resistance of the substrate only.

This measurement may then be compared with at least one threshold corresponding to a nominal resistive value, i.e. with a non-thinned substrate.

The term "contact" is understood to mean for example substrate contacts that are conventionally present in embodiments of integrated circuits, for example for biasing the substrate.

These contacts may be produced by implanting overdoped regions.

According to one implementation, said operation of measuring the resistive value of the substrate comprises an operation of applying a voltage difference between said at least one first contact and said wafer and an operation of measuring, at said at least one second contact, a current resulting from this voltage difference.

Measuring the current is a simple way of measuring the resistive value of the substrate, and because said vertical resistance and said lateral resistance are simultaneously taken into account, the variation in current between a non-thinned substrate and a substrate that has been thinned, even slightly, is substantial.

Again here, the measured value of the current may be compared with at least one threshold value corresponding to a nominal current value, i.e. with a non-thinned substrate.

It is further preferable for the space between said at least one first contact and said at least one second contact to be at least equal to half the thickness of the substrate before thinning, for example about the same thickness.

This makes it possible to increase the sensitivity of the measurement (between a non-thinned substrate and a thinned substrate).

In order to provide more effective protection from an attempt to breach the integrity of the integrated circuit by thinning the substrate, it is advantageous to provide a first contact group of a plurality of first contacts that are distributed over said front face and a second contact group of a plurality of second contacts that are distributed over said front face.

The first measurement is then advantageously taken between the first contact group of a plurality of first contacts, the second contact group of a plurality of second contacts and said electrically conductive wafer.

For this, a first measurement between the first contact group, the second contact group and the wafer may be taken in various ways.

A first way is, for example, to electrically connect all of the first contacts together and to electrically connect all of the second contacts together, and to take said first measurement just once, then to compare the result of the first measurement with a threshold value.

In this case, the number of first contacts may be the same as or different from the number of second contacts.

The resistive measurement of the substrate taken from a plurality of contacts corresponds to a measurement of the equivalent resistive value of a plurality of resistances connected in parallel. The nominal resistive value thus decreases by 1/N, where N is the number of resistances in parallel.

The number N of first and second contacts is advantageously chosen such that the corresponding nominal resistive value makes it possible to easily detect a variation in the measured resistive value resulting from the substrate being thinned, even slightly.

A person skilled in the art will be able to choose the number N according to, in particular, the nature of the substrate and its dimensions.

By way of indication, for a conventional silicon substrate with an area of 1×1 $mm^2$, N could take a value of about 500.

A second way is not to electrically connect the first contacts together and not to electrically connect the second contacts together, and to take the first measurement sequentially, taking a different pair of (first and second) contacts each time, then each time to compare the result of the corresponding measurement with a threshold value.

This threshold value could be the same each time or differ according to, for example, the structure of the integrated circuit and/or the site of the various pairs.

A third way, intermediate between the first way and the second way, is to electrically connect the first contacts together into first groups and to electrically connect the second contacts together into second groups, and to take the first measurement sequentially, taking a different pair of (first and second) groups of contacts each time, then each time to compare the result of the corresponding measurement with a threshold value.

The number of first contacts may be the same or differ from one first group to the next.

The number of second contacts may be the same or differ from one second group to the next.

Furthermore, in a pair of a first and a second group used for said measurement, the number of contacts from the first and second groups may be the same or different.

Again here, the threshold value could be the same each time or differ according to, for example, the structure of the integrated circuit and/or the site of the various groups.

A person skilled in the art will be able to choose from the various ways of taking the first measurement according to, for example, the resistivity of the substrate and/or the structure of the integrated circuit.

Similarly, a person skilled in the art will be able to adjust the various threshold values according to, for example, the resistivity of the substrate and/or the site of the contacts in question.

According to one implementation, it is advantageous for the operation of detecting the attempt to breach the integrity of the integrated circuit to further comprise, prior to the operation of detecting the thinning of the substrate, an operation of detecting a removal of at least a portion of the electrically conductive wafer.

This operation of detecting the removal of at least a portion of the wafer may comprise a prior operation of measuring a resistive value of the substrate between said at least one first contact and said wafer.

In other words, the lateral resistance of the substrate is not taken into account here; what is taken into account is only the vertical resistance of the substrate between the first contact and the wafer.

If the wafer is, for example, removed locally vertically in line with the first contact, then the measured vertical resistance becomes very high.

This prior operation of measuring a resistive value of the substrate between said at least one first contact and said wafer advantageously comprises an operation of applying a voltage difference between said at least one first contact and said wafer and an operation of measuring, at said at least one first contact, a current resulting from this voltage difference.

If the wafer is for example removed locally vertically in line with the first contact, then the measured value of the current becomes very low.

Comparing the measured value of the current with at least one threshold makes it possible to detect the at least local removal of the electrically conductive wafer.

Again here, to provide more effective protection from an attempt to breach the integrity of an integrated circuit by at least locally removing the electrically conductive wafer, it is advantageous to use the first group of a plurality of first contacts that are distributed over said front face.

The prior measurement is then advantageously taken between the first group and said electrically conductive wafer.

This prior measurement may also be taken all at once or sequentially.

According to another aspect, what is proposed is an integrated circuit comprising a semiconductor substrate having a front face and a back face, at least one first contact and at least one second contact, which are spaced apart and located on the front face, an electrically conductive wafer located on the back face, and a first detection circuit that is configured to detect a thinning of the substrate from the back face, said first detection circuit including a first measurement circuit that is configured to take a first measurement of a resistive value of the substrate between said at least one first contact, said at least one second contact and said electrically conductive wafer.

According to one embodiment, the first measurement circuit is configured to apply a voltage difference between said at least one first contact and said wafer, and to measure, at said at least one second contact, a current resulting from this voltage difference.

According to one embodiment, the space between said at least one first contact and said at least one second contact is at least equal to the thickness of the substrate before thinning.

According to one embodiment, the integrated circuit comprises
a first group of a plurality of first contacts that are distributed over said front face,
a second group of a plurality of second contacts that are distributed over said front face, and
wherein the first measurement circuit is configured to take the first measurement between the first group, the second group and said electrically conductive wafer.

According to one variant, the integrated circuit further comprises a second detection circuit that is configured to detect, prior to the operation of detecting the thinning of the substrate, a removal of at least a portion of the electrically conductive wafer.

According to one embodiment, the second detection circuit comprises a second measurement circuit that is configured to take a prior measurement of a resistive value of the substrate between said at least one first contact and said wafer.

According to one embodiment, said second measurement circuit is configured to apply a voltage difference between said at least one first contact and said wafer and to measure, at said at least one first contact, a current resulting from this voltage difference.

According to one embodiment, the second measurement circuit is configured to take said prior measurement between said first group and said electrically conductive wafer.

According to another aspect, what is proposed is an electronic device, for example a chip card, incorporating an integrated circuit such as defined above.

BRIEF DESCRIPTION OF THE DRAWINGS

Other advantages and features of the invention will become apparent upon examining the detailed description of completely non-limiting embodiments and modes of implementation of the invention and the appended drawings, in which.

DETAILED DESCRIPTION

Figure 1:
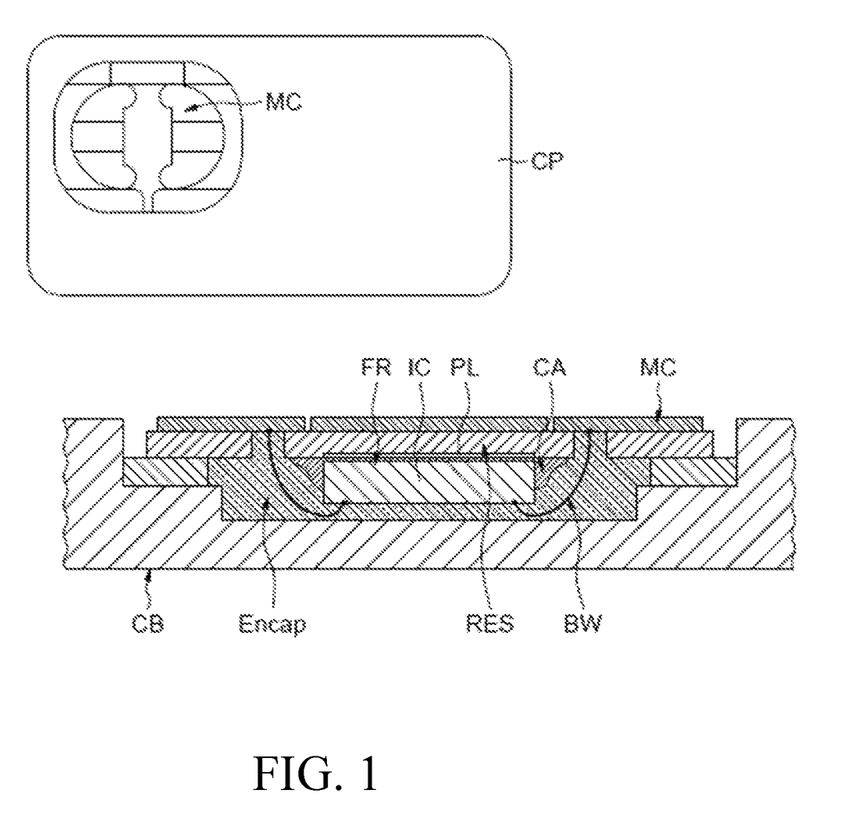
FIG. 1 shows a sectional view of an integrated circuit fitted to a chip card.

FIG. 1 shows an example of an integrated circuit IC fitted to a chip card CP.

A typical chip card CP is illustrated schematically at the top of FIG. 1. The integrated circuit IC is fitted into the card body CB of the chip card CP, under contacts MC. A section through this assembly is shown at the bottom of FIG. 1.

The integrated circuit IC conventionally comprises a semiconductor substrate surmounted by an interconnect portion (BEOL: back end of line).

The integrated circuit IC is covered with an electrically conductive wafer PL. This wafer is bonded to the back face FR of said substrate by a conductive adhesive layer CA and attaches the substrate to a face of a resin base RES.

The resin base RES bears, on its opposite face, contacts MC configured to make the connections from the integrated circuit IC to a terminal such as a card reader.

The integrated circuit IC is encapsulated in an insulating encapsulation layer Encap.

The insulating encapsulation layer Encap is itself encapsulated in a card body CB.

The connections between the contacts MC and the integrated circuit IC are made by means of wires BW, in a typical flip-chip configuration, with the wires BW being soldered to said contacts MC and to contact pads formed on the final metallization level of the interconnect portion.

The assembly formed by the electrically conductive wafer PL, the adhesive conductive layer CA and the resin RES forms a coating for the integrated circuit IC.

This does not rule out the possibility of using other coatings that are known in the field of integrated circuits, for example, for an application other than a chip card.

Figure 2:
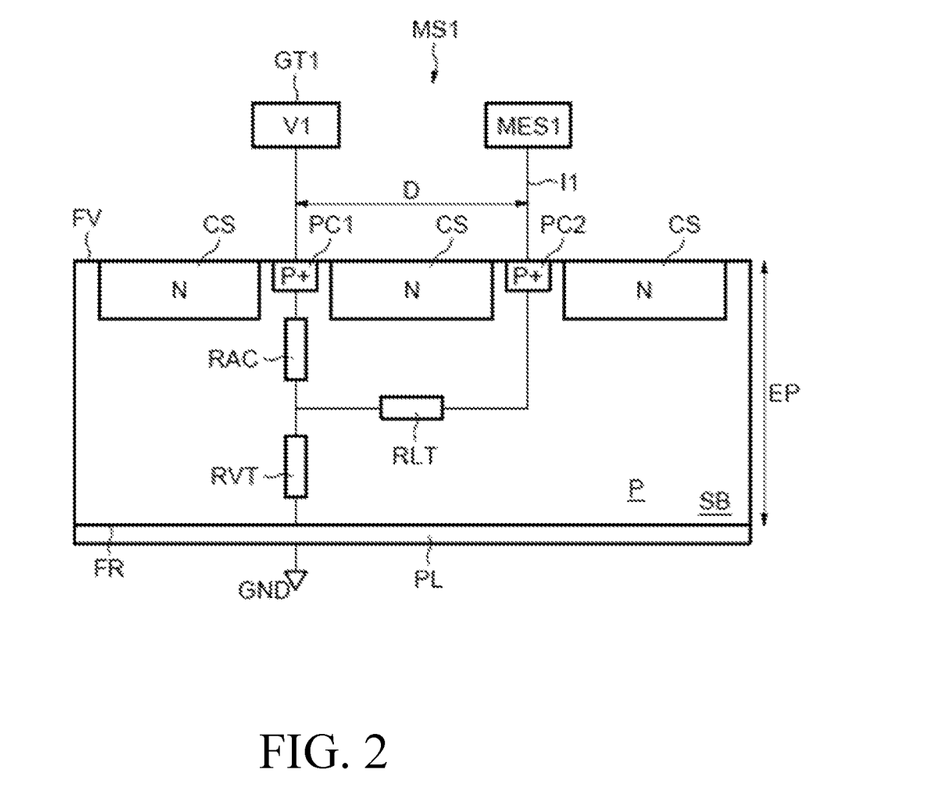
FIG. 2 shows an exemplary embodiment of the integrated circuit.

FIG. 2 shows an exemplary embodiment of the integrated circuit IC.

The integrated circuit IC includes a semiconductor substrate having a front face FV, a back face FR and contacts PCi which are distributed over the front face FV; only one first contact PC1 and one second contact PC2 are shown here.

Typically, the semiconductor substrate includes n-type semiconductor wells CS that are electrically isolated from the rest of the substrate, which here exhibits p-type conductivity.

The contacts PC1 and PC2 include $p^+$-type overdoped regions.

For example, to extract confidential data from a memory of the integrated circuit, an attacker needs to thin the substrate in order to get as close as possible to the components of the integrated circuit, which are formed on its front face.

Such thinning may comprise, for example, chemical-mechanical polishing from the rear face and/or machining, for example using a focused ion beam FIB.

To carry out the thinning, the attacker may locally remove a portion of the initial wafer or even the entire initial wafer.

After thinning, the attacker may leave the initial wafer partially removed, redeposit the initial electrically conductive wafer PL or deposit another wafer PL on the back face FR.

The integrated circuit then advantageously also includes first detection circuit that is configured to detect a thinning of the substrate from the back face FR.

The first detection circuit includes here a first measurement circuit MS1 that is configured to take a first measurement of a resistive value of the substrate between the first contact PC1, the second contact PC2 and said electrically conductive wafer PL.

The resistance that will be measured therefore includes an access resistance RAC, a vertical resistance RVT between the access resistance and the electrically conductive wafer PL and a lateral resistance RLT between the two contacts PC1 and PC2.

Although the depiction of the access resistance in FIG. 2 has been intentionally exaggerated for the sake of clarity, this access resistance represents the resistance of the substrate bulk between the front face FV and the adjacent well edges CS.

The first measurement circuit MS1 includes a circuit GT1 that is configured to apply a first voltage V1 to the contact PC1 while the wafer PL is configured to be grounded GND.

The measurement of the resistive value of the substrate will be obtained here by measuring the current I1 at the second contact PC2, this first current I1 resulting from the difference in voltage V1-0.

For this, the first measurement circuit MS1 includes a first current measurement circuit MES1, which is conventional in structure and known per se, that is intended to measure the current I1 and to compare it with at least one threshold.

This threshold corresponds, for example, to a nominal current value obtained for a non-thinned substrate.

Measuring the current is a simple way of measuring the resistive value of the substrate, and because the vertical resistance and the lateral resistance are simultaneously taken into account, the variation in current between a non-thinned substrate and a substrate that has been thinned, even slightly, is substantial.

The two contacts PC1 and PC2 are spaced apart by a distance D.

Although not essential, it is preferable for this distance D to be about the same as the thickness EP of the substrate before thinning. This makes it possible to increase the sensitivity of the measurement between a non-thinned substrate and a thinned substrate.

By way of indication, for a substrate that is 150 micrometers thick, this distance D will advantageously be at least equal to 75 micrometers, for example about 150 micrometers.

By way of example, for a substrate with a nominal thickness EP that is equal to 150 micrometers and a spacing D of 150 micrometers between the contacts PC1 and PC2, what is obtained is a nominal current I1 corresponding to a non-thinned substrate of about 10 microamperes.

Also by way of example, for a thinning by about 40 micrometers, what is obtained is a current I1 that is higher than 100 microamperes.

It is also advantageous for the operation of detecting the attempt to breach the integrity of the integrated circuit to further comprise, prior to the operation of detecting the thinning of the substrate, an operation of detecting a removal of at least a portion of the electrically conductive wafer PL.

This operation of detecting the at least local removal of the wafer may then comprise a prior operation of measuring a resistive value of the substrate between the first contact and the wafer.

In other words, the lateral resistance of the substrate is then not taken into account; only the sum of the access resistance RAC and the vertical resistance RVT of the substrate between the first contact PC1 and the wafer PL is.

If the wafer is, for example, removed locally vertically in line with the first contact, then this measured resistance becomes very high.

In terms of current, if the wafer is, for example, removed locally vertically in line with the first contact PC1, then the measured value of the current becomes very low.

Figure 3:
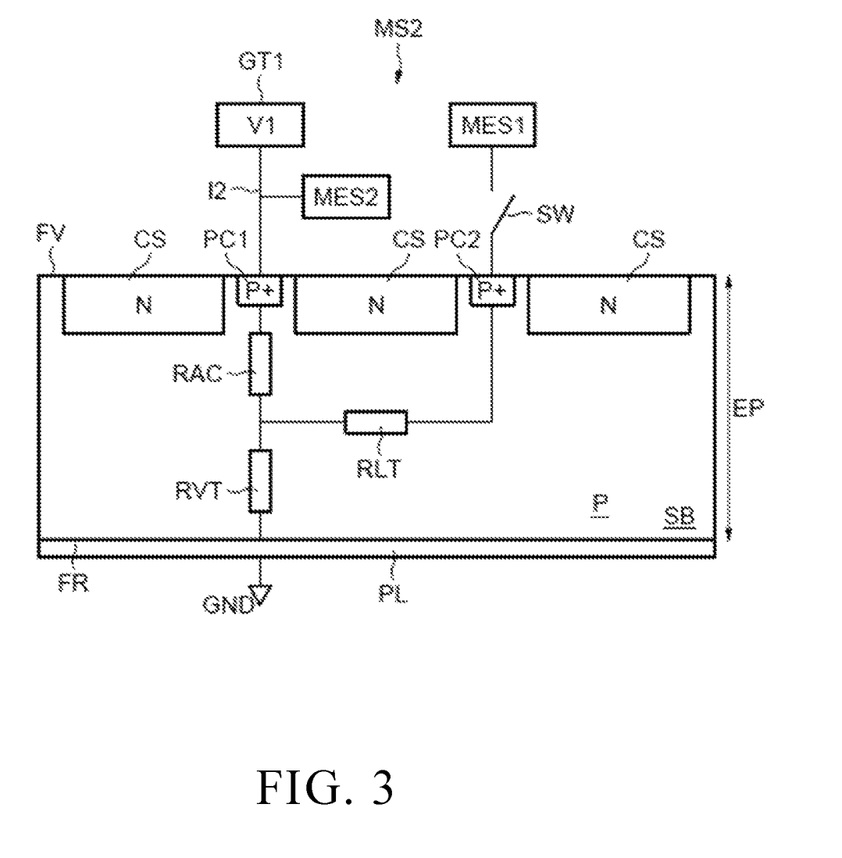
FIG. 3 shows an exemplary embodiment of the integrated circuit.

From a hardware point of view, the integrated circuit may include to this end, as illustrated schematically in FIG. 3, a second detection circuit MS2 that is configured to detect, prior to the operation of detecting of the thinning of the substrate, a removal of at least a portion of the electrically conductive wafer PL.

More specifically, it is possible, for example, to provide a switch SW allowing the first current measurement circuit MES1 to be disconnected from the second contact PC2 for the purpose of taking this prior measurement.

The second measurement circuit MS2 then includes the circuit GT1 that is configured to apply the voltage V1 to the first contact PC1, the wafer PL being grounded.

The measurement circuit MS2 also includes a second current measurement circuit MES2, for example with a structure that is analogous to that of the first current measurement circuit MES1, that is configured to measure the current I2 resulting from the difference in voltage V1-0 applied between the contact PC1 and the wafer PL.

The second current measurement circuit MES2 may then compare this current I2 with a second threshold for the purpose of detecting a removal of the wafer PL.

Figure 4:
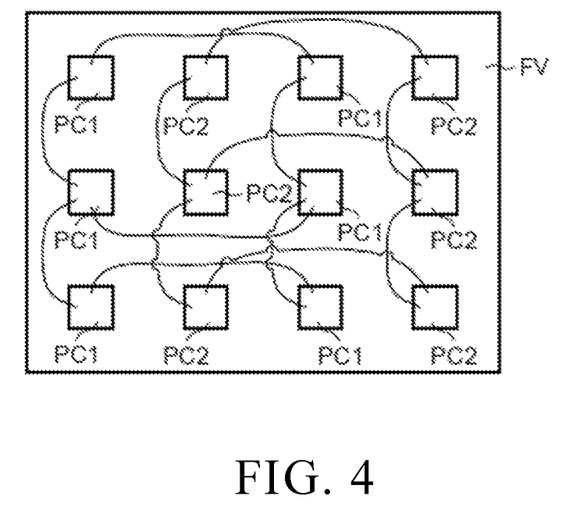
FIG. 4 schematically illustrates the provision of groups of contacts distributed over the front face.

As illustrated in FIG. 4, in order to provide more effective protection from an attempt to breach the integrity of the integrated circuit by thinning the substrate and/or at least locally removing the wafer PL, it is advantageous to provide a first contact group formed by a plurality of first contacts PC1 that are distributed over the front face FV of the integrated circuit and a second contact group formed by a plurality of second contacts PC2 that are distributed over said front face FV.

Although not the only possible configuration, as explained above, all of the first contacts PC1 are electrically connected to one another and all of the second contacts PC2 are electrically connected to one another in the example described here.

The first measurement of the current I1 is then advantageously taken between the first contact group of contacts PC1, the second contact group of contacts PC2 and the electrically conductive wafer PL.

Similarly, the second measurement of the current I2 may advantageously be taken between the first contact group of a plurality of first contacts PC1 and the electrically conductive wafer PL.

Figure 5:
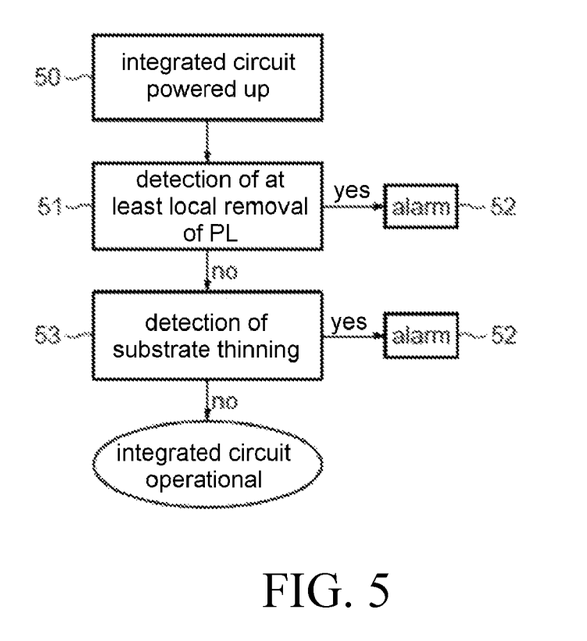
FIG. 5 illustrates steps of a method.
Figure 6:
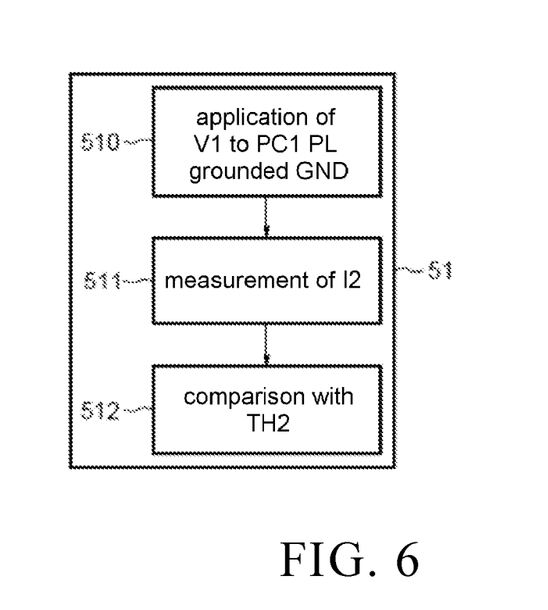
FIG. 6 illustrates steps of a method.
Figure 7:
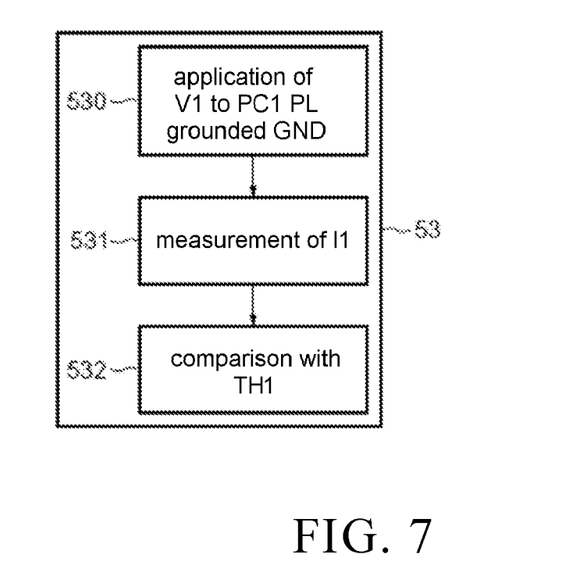
FIG. 7 illustrates steps of a method.

Reference is now made more particularly to FIGS. 5 to 7 in order to illustrate implementations of a method according to the invention.

In FIG. 5, after the integrated circuit has been powered up 50, in step 51, the semiconductor wafer PL is removed, at least locally.

If a removal is indeed detected, then an alarm signal may be transmitted.

The term "alarm signal" is understood to mean for example a signal allowing conventional countermeasure means for countering such an attack to be triggered, or the operation of the integrated circuit to be stopped.

If an at least local removal of the conductive wafer PL is not detected, then the method moves on to step 53 in which a thinning of the substrate is detected.

If even minimal thinning of the substrate is detected, then the method returns to step 52 of transmitting the alarm signal.

However, if no thinning of the substrate is detected, then the integrated circuit is considered to be operational.

As already mentioned above and as illustrated in FIG. 6, step 51 of detecting an at least local removal of the wafer PL may comprise an operation of applying 510 the voltage V1 to the contact PC1 and an operation of grounding the wafer PL. The switch SW is open.

Next, the resulting current I2 is measured at the contact PC1 (step 511).

This current I2 is then compared with a threshold TH2 (step 512) in order to determine whether an at least local removal of the wafer PL has taken place.

With regard to step 53, as illustrated in FIG. 7, it may also comprise an operation of applying the voltage V1 to the contact PC1 and an operation of grounding the wafer PL (step 530).

This operation 530 is followed by the operation of measuring the current I1 (step 531) at the second contact PC2 (switch SW closed) then by an operation of comparing this current I1 with another threshold TH1 (step 532).

The invention claimed is:

1. A method for detecting an attempt to breach the integrity of an integrated circuit which includes a semiconductor substrate doped solely with a first conductivity type and having a front face and a back face, the method comprising:
    detecting a thinning of the semiconductor substrate from the back face, wherein detecting the thinning comprises:
        first measuring a resistive value of the semiconductor substrate between a first contact located on the front face, a second contact located on the front face and an electrically conductive wafer located on the back face, wherein the first and second contacts are spaced apart from each other, and wherein the electrically conductive wafer is in direct electrical connection with the back face of the semiconductor substrate.

2. The method according to claim 1, wherein first measuring the resistive value of the substrate comprises:
    applying a voltage difference between said first contact and said electrically conductive wafer; and
    measuring, at said second contact, a current resulting from said voltage difference.

3. The method according to claim 1, wherein a space between said first contact and said second contact is greater than or equal to half a thickness of the semiconductor substrate before thinning.

4. The method according to claim 1, wherein first measuring is performed between a first contact group formed by a plurality of first contacts that are distributed over said front face, a second contact group formed by a plurality of second contacts that are distributed over said front face and said electrically conductive wafer.

5. The method according to claim 1, wherein detecting the attempt further comprises, prior to detecting the thinning of the semiconductor substrate, detecting a removal of at least a portion of the electrically conductive wafer.

6. The method according to claim 5, wherein detecting the removal of at least a portion of the electrically conductive wafer comprises: second measuring a resistive value of the semiconductor substrate between said first contact and said electrically conductive wafer.

7. The method according to claim 6, wherein second measuring the resistive value of the semiconductor substrate comprises:
    applying a voltage difference between said first contact and said electrically conductive wafer; and
    measuring, at said first contact, a current resulting from said voltage difference.

8. The method according to claim 6:
    wherein said first contact comprises a first contact group formed by a plurality of first contacts that are distributed over said front face; and
    wherein second measuring is performed between said first contact group and said electrically conductive wafer.

9. The method according to claim 1, wherein the resistive value of the semiconductor substrate consists essentially of an access resistance for at least one of the first and second contacts, a lateral resistance between the first contact and the second contact, and a vertical resistance between the access resistance and the electrically conductive wafer.

10. An integrated circuit, comprising:
    a semiconductor substrate doped solely with a first conductivity type and having a front face and a back face;
    a first contact and a second contact, wherein the first and second contacts are spaced apart from each other and located on the front face;
    an electrically conductive wafer located on the back face, wherein the electrically conductive wafer is in direct electrical connection with the back face of the semiconductor substrate; and
    a first detection circuit that is configured to detect a thinning of the semiconductor substrate from the back face, said first detection circuit including:
        a first measurement circuit that is configured to take a first measurement of a resistive value of the semiconductor substrate between said first contact, said second contact and said electrically conductive wafer.

11. The integrated circuit according to claim 10, wherein the first measurement circuit is configured to apply a voltage difference between said first contact and said electrically conductive wafer and to measure, at said second contact, a current resulting from said voltage difference.

12. The integrated circuit according to claim 10, wherein a space between said first contact and said second contact is greater than or equal to half a thickness of the semiconductor substrate before thinning.

13. The integrated circuit according to claim 10, wherein said first contact comprises a first contact group formed by a plurality of first contacts that are distributed over said front face, wherein said second contact comprises a second contact group formed by a plurality of second contacts that are distributed over said front face, and wherein the first measurement circuit is configured to take the first measurement between the first contact group, the second contact group and said electrically conductive wafer.

14. The integrated circuit according to claim 10, further comprising a second detection circuit that is configured to detect, prior to the operation of detecting the thinning of the semiconductor substrate, a removal of at least a portion of the electrically conductive wafer.

15. The integrated circuit according to claim 14, wherein the second detection circuit comprises a second measurement circuit configured to take a second measurement of a resistive value of the semiconductor substrate between said first contact and said electrically conductive wafer.

16. The integrated circuit according to claim 15, wherein said second measurement circuit is configured to apply a voltage difference between said first contact and said electrically conductive wafer and to measure, at said first contact, a current resulting from this voltage difference.

17. The integrated circuit according to claim 15, wherein said first contact comprises a first contact group formed by a plurality of first contacts that are distributed over said front face, and wherein the second measurement circuit is configured to take said prior measurement between said first contact group and said electrically conductive wafer.

18. The integrated circuit according to claim 10, wherein the integrated circuit is a component of an electronic device.

19. The integrated circuit according to claim 18, wherein the electronic device is a chip card.

20. The integrated circuit according to claim 10, wherein the resistive value of the semiconductor substrate consists essentially of an access resistance for at least one of the first and second contacts, a lateral resistance between the first contact and the second contact, and a vertical resistance between the access resistance and the electrically conductive wafer.

* * * * *